Feb. 13, 1923.

A. W. BURT.
HANDLE FOR SAUCEPANS.
FILED AUG. 27, 1921.

1,445,484.

Inventor
A. W. Burt
by
W. E. Evans
Attorney.

Patented Feb. 13, 1923.

1,445,484

UNITED STATES PATENT OFFICE.

ALBERT WILLIAM BURT, OF CAMBRIDGE, ENGLAND.

HANDLE FOR SAUCEPANS.

Application filed August 27, 1921. Serial No. 496,135.

*To all whom it may concern:*

Be it known that I, ALBERT WILLIAM BURT, a subject of the King of Great Britain and Ireland, residing at 95 Regent Street, Cambridge, England, have invented certain new and useful Improvements Relating to Handles for Saucepans (for which I have filed an application in England, No. 152,456, dated Aug. 5, 1919), of which the following is a specification.

This invention relates to lifting bars or handles for saucepans and pans, and has for its object to provide a separate handle or lifting bar capable of being readily connected to the usual handle of saucepans in order to permit of the saucepan being lifted so as to avoid the strain imposed when lifting heavy saucepans as usual by means of the usual handle alone. For this purpose a bar or lever is provided one end of which is adapted to engage the ordinary handle of the saucepan near its outer or upper end. This bar or lever is also connected to the handle in a position near the lower end as for example by means of a hook, ring, chain or any other fastening, and the bar or lever then extends into a position over the saucepan where it may be formed suitably for being held.

The invention may be carried into effect in various ways and in the use of separate handles or levers of varying form. For example the end of the bar or lever engaging the upper or outer end of the handle of the saucepan may be forked or it may be provided of any other form adapted to engage the saucepan handle in such manner that it is incapable of being laterally displaced in use, while similarly the connection of the bar or lever to the handle of the saucepan near its lower end may be effected in many ways.

The invention is thus also applicable to saucepans of large diameter such as fish kettles and other similar culinary vessels provided with two loops.

The invention is illustrated in the accompanying drawing in which

Figure 1:
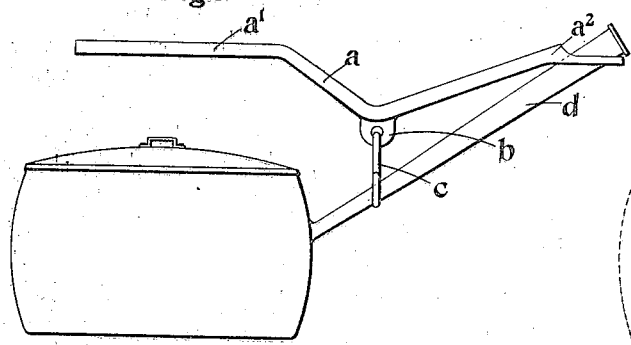
Figure 2:
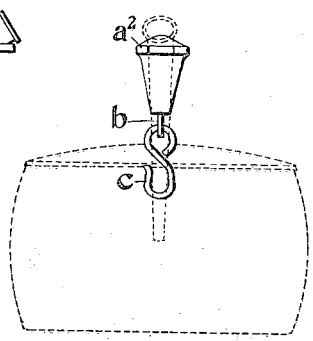
Figure 3:
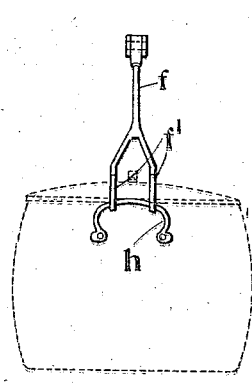
Figure 4:
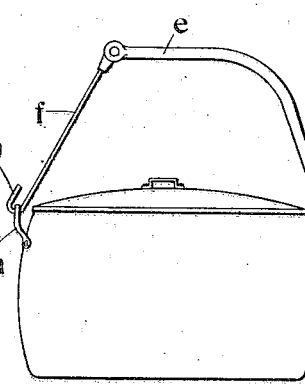
Figure 5:
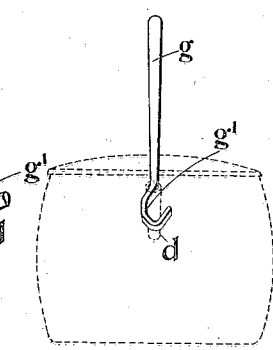

Figures 1 and 2 are side and end elevations respectively of one form of lifting handle provided according to the invention, while Figures 3, 4 and 5 are side and end elevations respectively of a modified form.

In the form illustrated in Figures 1 and 2, the bar $a$ is provided of a curved shape by means of which the handle portion $a^1$ is thus adapted to be disposed in use at a distance sufficiently convenient above the saucepan, while the bar is provided with a lug $b$ by which a hook $c$ is carried, the hook being adapted to engage the usual handle $d$ of a saucepan near the lower end. The opposite end of the bar $a^2$ is forked for engaging the handle of the saucepan near its outer or upper extremity.

The bar $a$, instead of having merely its end adapted generally to the shape of a saucepan handle may be provided with one part to conform to a part of the length of the ordinary handle of the saucepan, and means may be provided of any suitable form for holding the bar on to the handle and permitting of the bar being used for lifting the saucepan in substantially the same manner as hereinbefore described.

It will thus be understood that the bar may take a variety of forms adapted to the usual saucepan handle without departing from the invention.

According to the modification illustrated in Figures 3, 4 and 5, I provide the lifting handle or device as a bar or central part $e$, at the ends of which downwardly extending parts $f$ and $g$ are connected or provided having hooks $f^1$ $g^1$ or other engaging means at their lower ends respectively to engage the outwardly extending inclined handle bar $d$ at one side of a large saucepan and at the other end to engage the handle $h$ provided thereon of a loop form. The central part $e$ may be integrally provided with one of the downwardly depending parts $g$, but one or other of the downwardly depending parts such as $f$ is pivotally connected to the central bar in order to adapt the lifting handle or lifting device thus constituted to saucepans of varying size, and that part such as $f$ which is pivotally connected has the pivotal axis disposed horizontally with reference to the position of use in lifting the saucepan.

The lifting handle or device is advantageously provided of metal and its central part $e$ is adapted to be gripped by the hand in a middle position, so that the weight of the saucepan and its contents are thus supported centrally.

The pivotally connected part such as $f$ has its lower end advantageously formed with two hooks $f^1$, that is to say its lower end may be forked, and the stems of the fork each formed to a hook shape to engage the loop handle *h* near each end, while on the other side a downwardly depending part *g¹* is provided of a substantially hook shape to engage the outwardly extending handle bar *d* near the part of connection with the saucepan. By such means the saucepan may be lifted in the manner of a bucket and inasmuch as the loop handle *h* is rigidly supported near its respective ends, there is no possibility of the saucepan tilting in being lifted or moved from place to place.

It will be understood that when the handle or device is provided for use with such saucepans as fish kettles usually provided with two loop handles in oppositely disposed positions, the respective downwardly depending parts *f g* may each be provided with a fork and hooked ends in the manner hereinbefore described, or only one of them may be so provided.

When the lifting handle or device is adapted for use with saucepans having a straight outwardly extending handle, the hook *g¹* is provided of a V-shape, so that thus the outwardly extending handle *d* may be supported on two lines only. Or again the hook may be provided with a flat central part adapted to engage beneath the handle, or the hook may be provided of any other form.

Again such a lifting bar or handle may be adapted for use both upon saucepans or other culinary utensils having in one position a handle of a straight outwardly extending form, and in the opposite position a handle of a loop form, and upon saucepans or culinary utensils having handles disposed in opposite positions both of a loop form. For example the hook which is adapted for engaging the outwardly extending straight handle *d* may be pivotally connected to the downwardly depending part of the handle or device in such manner that it may be rotated into a position at right angles to engage the handle of loop form when it is desired to use the device with a saucepan having two loop handles.

I claim:

1. A lifting bar having one end adapted to the handle of a saucepan for contact therewith while its other end serves as a handle and extends into a position immediately above the saucepan, means being provided between the respective ends of the bar for the connection of the bar to the saucepan handle near its lower end, for the purpose and substantially as described.

2. A lifting bar comprising a central part, having means at one end to contact with a handle of the saucepan or other utensil with respect to which it is to be used and at the other a downwardly extending part pivotally connected to the central part of the bar, the downwardly extending part being adapted to engage a handle of the saucepan, substantially as described.

ALBERT WILLIAM BURT.